United States Patent [19]

Wills et al.

[11] Patent Number: 5,686,528
[45] Date of Patent: Nov. 11, 1997

[54] CORE-SHELL IMPACT MODIFIERS FOR STYRENIC RESINS

[75] Inventors: William L. Wills, Roebling; Albin P. Berzinis, Medford, both of N.J.

[73] Assignee: Rohm and Haas Company, Philadelphia, Pa.

[21] Appl. No.: 20,898

[22] Filed: Feb. 22, 1993

Related U.S. Application Data

[63] Continuation of Ser. No. 478,603, Feb. 12, 1990, abandoned, which is a continuation of Ser. No. 268,107, Nov. 7, 1988, abandoned, which is a continuation of Ser. No. 921,709, Oct. 21, 1986, abandoned.

[51] Int. Cl.⁶ .................................................. C08L 51/04
[52] U.S. Cl. .......................... 525/68; 525/71; 525/86; 525/310; 525/316; 525/902
[58] Field of Search ............................ 525/310, 316, 525/902, 68, 71, 86

[56] References Cited

U.S. PATENT DOCUMENTS

| | | | |
|---|---|---|---|
| 3,177,268 | 4/1965 | Frazer et al. | 525/316 |
| 3,509,237 | 4/1970 | Aubrey | 525/316 |
| 3,886,235 | 5/1975 | Tanaka et al. | |
| 3,887,652 | 6/1975 | Carrock et al. | 525/316 |
| 3,985,693 | 10/1976 | Lonning | 525/316 |
| 4,042,647 | 8/1977 | Cornell | 260/830 |
| 4,046,839 | 9/1977 | Papetti | |
| 4,064,093 | 12/1977 | Dalton et al. | 525/316 |
| 4,304,881 | 12/1981 | Aoki et al. | 525/68 |
| 4,308,358 | 12/1981 | Miller | 525/267 |
| 4,330,641 | 5/1982 | Echte et al. | 525/310 |
| 4,371,663 | 2/1983 | Russell | 525/70 |
| 4,410,661 | 10/1983 | Epstein et al. | 525/66 |
| 4,443,585 | 4/1984 | Goldman | 525/310 |
| 4,639,488 | 1/1987 | Schuette et al. | |
| 4,684,696 | 8/1987 | Bates et al. | 525/68 |
| 4,740,560 | 4/1988 | Moore et al. | 525/75 |
| 4,764,563 | 8/1988 | Meredith et al. | 525/316 |

FOREIGN PATENT DOCUMENTS

| | | |
|---|---|---|
| 143500 | 6/1985 | European Pat. Off. |
| 158258 | 10/1985 | European Pat. Off. |
| 208382 | 1/1987 | European Pat. Off. |
| 840153 | 7/1960 | United Kingdom |

OTHER PUBLICATIONS

C.B. Bucknall, Toughened Plastics, Applied Science, London, 1977.

J. Silberberg, et al., Journal of Applied Polymer Science, vol. 22, pp. 599–609.

A.M. Donald et al., Journal of Applied Polymer Science, vol. 27, pp. 3729–3741.

"Structure and properties of block polymers and multiphase polymer systems: an overview of present status and future potential," Polymer, pp. 938–956, vol. 17 (1976).

*Primary Examiner*—Joseph L. Schofer
*Attorney, Agent, or Firm*—Darryl P. Frickey; Richard A. Haggard

[57] ABSTRACT

High-impact poly(styrene) resins modified with small-particle-size, multi-stage impact modifiers having a crosslinked poly(butadiene) core and a poly(styrene) or other vinylaromatic polymer shell show an improved balance of impact strength, stiffness and surface gloss, and an improved resistance to environmental stress crazing, when compared to conventional high-impact poly(styrene).

21 Claims, No Drawings

CORE-SHELL IMPACT MODIFIERS FOR STYRENIC RESINS

This is a continuation of application U.S. Ser. No. 07/478,603 now abandoned, filed Feb. 12, 1990, which is a continuation of application U.S. Ser. No. 07/268,107, filed Nov. 7, 1988, now abandoned, which is a continuation of application U.S. Ser. No. 06/921,709, filed Oct. 21, 1986, now abandoned.

This invention relates to modifiers for styrenic resins, and more particularly to butadiene-styrene impact modifiers for aromatic and olefinic resins.

BACKGROUND OF THE INVENTION

Commercial high-impact polystyrene (HIPS) is typically prepared by continuous bulk polymerization with rubbery polybutadiene impact modifiers. During the polymerization the modifiers form domains about 2-5 micrometers in diameter within the polymer. Although tougher than unmodified polystyrene, such HIPS has a poorer balance of impact strength, surface gloss and mechanical properties than competing resins such as acrylonitrile-butadiene-styrene (ABS), and has poorer environmental stress-craze resistance to food oils. The high viscosities generated by high loading of polybutadiene and by the conditions required for proper concurrent polymerization of the polystyrene matrix polymer limit the property balance obtained by this process, so that high impact resistance, high gloss and high strength are difficult to obtain in a single, bulk polymerization.

Impact modifiers considered useful by the prior art for improving impact resistance of polystyrene have particle sizes greater than two micrometers. C. B. Bucknall, *Toughened Plastics*, Applied Science, London, 1977, states that emulsion polymers having particle sizes substantially smaller than one micrometer are unsuitable for making HIPS. More recently J. Silberberg et al., *Journal of Applied Polymer Science*, Vol. 22, pages 599-609 (1978) reported that the threshold particle size for an effective polystyrene modifier is above one micrometer, and preferably 2-5 micrometers. A. M. Donald et al., *Journal of Applied Polymer Science*, Vol. 27, pages 3729-3741 (1982) actually advocates removal of all modifier particles smaller than one micrometer in diameter for most efficient toughening of polystyrene, as such particles are considered to be ineffective diluents. Although Hobbs, European Patent Publication 158,258, teaches grafting small (below 1000 nm) rubber particles to polystyrene chains and incorporating the resulting modified styrene polymer with a styrene polymer containing larger (3-10 μm) particles of rubbery impact modifier, Damen, European Patent Publication 143,500, teaches that using bimodal size distribution of the modifiers-sacrifices gloss for superior impact strength.

Damen, above, does teach that domains of rubbery impact modifier smaller than 250 nm may be introduced into poly(styrene) by an elaborate process of block copolymerizing the rubber monomer with a styrenic monomer, solubilizing the copolymer in styrene monomer, and bulk polymerizing the solution. Phase inversion in the polymerizing system precipitates the small domains of rubber throughout the poly(styrene) to produce a resin with an adequate balance of gloss and impact strength.

Additive impact modifiers have been used to improve physical properties in HIPS. Typically these are made by anionically polymerizing styrene and butadiene to form block copolymers having discrete segments of poly (butadiene) and poly(styrene) covalently linked end to end. Such block copolymers are also known as thermoplastic elastomers. Because these copolymers are not covalently crosslinked during manufacture, properties of styrene blends made from them are highly dependent on such processing conditions as shear rate and blending temperature. Such styrene-block copolymer blends have found utility for ignition-resistant resins, but they are not considered economical for most other uses, and their resistance to chemical attack is little better than that of conventional HIPS.

For a discussion of block copolymers, their structure, physical properties and other characteristics, that will assist in understanding the difference between such polymers and the polymers of the invention set forth below, one may consult, for instance, Aggarwal, "Structure and Properties of Block Polymers and Multiphase Polymer Systems: an Overview of Present Status and Future Potential," *Polymer*, Vol. 17, pp. 938-956 (November, 1976).

Other uses of block copolymers as impact-property modifiers for poly(styrene) are disclosed by Miller, U.S. Pat. No. 4,308,358, in which a bulk-polymerized block copolymer is melt blended with poly(styrene), and Russell, U.S. Pat. No. 4,371,663 in which the block copolymer is crosslinked and blended with HIPS. Russell determines the swell index of his copolymers, and observes that as the swell index increases (i.e., polymer crosslinking decreases) the impact resistance of the modified poly(styrene) decreases.

Swell index is also applied to large-particle-size, rubbery impact modifiers by Echte et al, U.S. Pat. No. 4,330,641. This patent teaches that stress-cracking resistance is achieved only when particles are larger than 3.5 μm.

Methacrylate-butadiene-styrene (MBS) impact modifiers are well known for modifying poly(vinylchloride) resins, as for example those taught by Goldman, U.S. Pat. No. 4,443,585. Such modifiers in recent years have also been found useful for modifying other polymers, such as polycarbonates, crystallizable thermoplastic polyesters, and other engineering resins. Emulsion-polymerized MBS modifiers have been used to modify blends of transparent HIPS with polyphenylene ethers, but the form of these modifiers has been a particle with a large, relatively hard core of polystyrene surrounded by a thin, softer, rubbery shell.

SUMMARY OF THE INVENTION

We have discovered an impact-modifying additive polymer having a particle size below about 250 nanometers (nm) and further having a rubbery core of crosslinked, conjugated diolefin polymer or copolymer surrounded by one or more shells of polymer, at least one of which shells is a vinylaromatic polymer or copolymer, the additive polymer having a toluene swell index of from about 13 to about 45. This additive polymer is useful in improving the balance of impact strength and other physical properties such as gloss, stiffness and resistance to environmental stress crazing, when blended with aromatic addition and condensation polymers, polyolefins, and blends thereof, including such polymers blended with conventional impact-strength modifiers.

DETAILED DESCRIPTION OF THE INVENTION

The term "additive polymer," as used herein, is intended to mean a polymeric composition useful as an additive to other polymeric compositions. The additive polymer of the present invention is intended as an additive for aromatic addition and condensation polymers, preferably for styrenic resins such as poly(styrene) or for polyphenylene oxide resins, for polyolefin resins such as polypropylene, and for blends of other resins. It may be present in such resins alone or, more preferably, in the presence of other additive polymers such as conventional impact-modifying polymers useful with these resins. These other polymers are preferably present at levels of from about 1 to about 30% by weight.

The additive polymers of the present invention have a rubbery core of conjugated diolefin polymer or copolymer such as polymers or copolymers of butadiene, isoprene, chloropene and dimethylbutadiene, preferably butadiene. The term "copolymer," as used herein, is intended to mean a polymer produced by copolymerizing two or more monomers that are copolymerizable with one another. A designation of the type of copolymer, such as "conjugated diolefin," "butadiene" or "vinylaromatic," as used herein, is intended to mean that the designated type of monomer formed the largest fraction of monomers in the mixture that was copolymerized, unless otherwise specifically indicated. In the present instance the conjugated diolefin may be copolymerized with a minor amount of a copolymerizable vinylic monomer such as styrene, alkylstyrene, alkyl acrylates and methacrylates where the alkyl group contains from 1 to 8 carbon atoms, and nitriles such as acrylonitrile and methacrylonitrile. The preferred percentage of this vinylic monomer is from zero to about 50, by weight, these percentages being based upon the total weight of the diolefin and any other vinylic monomer used to prepare the rubbery core polymer.

This core polymer is typically crosslinked, either by copolymerizing with a crosslinking monomer or through crosslinking which results from selection of suitable polymerization conditions. Such a selection of conditions involves selecting temperatures, initiators, presence or absence and type of chain regulating agents, and the like, in a manner well known to those skilled in the art. Crosslinking monomers are similarly well known and comprise polyethylenically unsaturated monomers such as divinylbenzene, trivinylbenzene, ethylene glycol dimethacrylate, butylene glycol dimethacrylate, trimethylolpropane trimethacrylate and many others which will be apparent to those skilled in the art. Crosslinking is critical to the effectiveness of the composition as an impact modifier, as it acts to maintain the structural integrity of the modifier during processing and fabrication steps performed on the polymer. As crosslinking may not be readily measured directly, a secondary parameter, the toluene swell index, which relates to the degree of crosslinking, is used herein to define the crosslink density of the composition. This parameter is the ratio of toluene-swollen polymer weight to dried polymer weight for a given sample. The crosslink density of the core polymer must be controlled such that the toluene swell index of the finished core-shell particle is from about 13 to about 45, preferably from about 15 to about 25. The effectiveness of such a lightly crosslinked impact modifier is especially surprising in view of the teaching of Russell, above, that increased crosslinking (lower swell index) improves impact resistance.

Surrounding the rubbery core polymer are one or more polymer shells of at least one of which is a shell of vinylaromatic polymer or copolymer such as styrene or alkylstyrene, e.g., alpha-methylstyrene, polymer or copolymer. The ratio of core polymer to shell polymer is from about 30:70 to about 95:5 by weight, based on the total core and shell weight. The preferred core-to-shell ratio is from about 60:40 to about 80:20. The shells may be crosslinked by copolymerizing them with polyvinyl unsaturated crosslinking monomers.

The optional shells may comprise vinylaromatic polymers or copolymers, or methyl methacrylate polymers or copolymers, including copolymers with alkyl acrylates having 1 to 8 carbon atoms, such as ethyl acrylate. The other copolymerizable monomers may be present with the methyl methacrylate in the monomer mixture that is polymerized to make the optional additional shells at levels of from 0 to 99% by weight, based on the total weight of methyl methacrylate and other copolymerizable monomers. The optional additional shells may comprise from zero to about 25% by weight, of the total weight of core, and shells, and may be similarly crosslinked.

The additive polymers of the present invention are especially small; their particle diameter is about 250 nm or smaller, preferably from about 50 to about 250 nm, and more preferably from about 156 to about 200 nm. Any suitable method, such as emulsion polymerization, may be used for preparing particles of that size having the required core-shell structure. If the additive polymers are made by emulsion polymerization, the polymerization may be conducted such that the resulting latex particles will inherently have a narrow distribution of particle diameters.

These particles are significantly smaller than typical modifiers used with polystyrene to make HIPS, and appear to function synergistically with the larger modifier particles. They produce an observable but significantly smaller improvement in the impact resistance of styrene homopolymer than of HIPS.

The additive polymers of the present invention, in addition to being useful for improving the physical properties of HIPS and other styrenic polymers, are also useful in improving the physical properties of blends of HIPS with other compatible polymers or copolymers, including polyolefins and aromatic condensation polymers such as polyphenylene oxides. They also improve the physical properties of unmodified polystyrene and other aromatic addition and condensation polymers, of copolymers of styrene and other vinylaromatic monomers with other monomers such as acrylic and methacrylic monomers, unsaturated carboxylic acid and anhydride monomers such as maleic anhydride, and nitriles such as acrylonitriles. They also improve the physical properties of polyolefins, as for example polypropylene.

Those skilled in the art will understand the term "domain" to mean a polymeric material included in, but distinguishable from, the matrix polymer.

The following examples are intended to illustrate the present invention, and not to limit it except as it is limited in the claims. All proportions are by weight unless otherwise noted, and all reagents are of good commercial quality.

Polymer blends described in the following examples were prepared by mixing the matrix polymer and the modifier during melt extrusion in a counter-rotating American Leistritz 33-mm twin-screw extruder at a throughput rate of 100 g per minute, using a die melt temperature of 200°–220° C. for modified polystyrenes, 225°–230° C. for blends containing polypropylene and 250°–260° C. for blends containing polyphenylene oxide (PPO). The molten extrudate was collected as a strand which was cooled in a water bath and cut into pellets.

Test specimens were prepared by loading the test pellets into a 28-g-capacity, Newbury Industries reciprocating-screw injection molding machine operating at a melt temperature of 230°–250° C. for modified polystyrenes, 220°–225° C. for modified polypropylenes and 295°–300°

C. for polymers containing PPO, and injecting the test polymer into chrome-plated mold cavities cut to ASTM specifications and heated to 43°–49° C. for modified polystyrene and polypropylene, or 91°–93° C. for blends containing PPO. Test specimens were conditioned according to ASTM D618, Procedure A.

The following tests were used to evaluate the properties of polymers in the examples below:

Notched Izod impact strength was determined using 3.2× 12.7×63.5-mm (⅛×½×2.5 inch) test specimens according to ASTM Standard Procedure D256.

Falling-dart impact strength was determined using a Dynatup™ instrumented drop tower manufactured by Effects Technology, Inc. Test specimens of 50.8×76.2×3.2 mm (2×3×⅛ inch) were clamped onto a support ring 31.8 mm (1¼ inch) in diameter and struck at a velocity of 305 cm/sec with an instrumented dart having a tip diameter of 12.7 mm (½ inch). The energy absorbed by the sample up to the point of tear-through by the dart was integrated, and an average of at least three impacts was reported.

Tensile strength was determined using a 2.54-mm-thick microtensile specimen according to ASTM Standard Procedure D638, using a strain rate of 100% elongation per minute.

Surface gloss was measured using 50.8×76.2×3.2-mm (2×3×⅛ inch) injection-molded plaques using a Gardner Glossmeter and an incident angle of 60°.

Toluene swell index was determined using a small sample of dried modifier, typically 0.15–0.25 g, weighed into a glass vial and covered with about 45 ml of commercial-grade toluene. The sample was allowed to stand covered for three days at room temperature to allow full equilibration, and the swollen sample was then quickly filtered from the toluene and weighed. The wet sample was then carefully dried in a vacuum oven at 80° C. and reweighed. The swell index was calculated by dividing the weight of the swollen sample by that of the dried sample.

Environmental stress-craze resistance (ESCR) was determined using injection-molded test specimens prepared as for the Notched Izod impact strength test. The bar was clamped in a fixture having a radius such that the outer surface of the bar was subjected to 1% strain. The clamped bar was then immersed in the indicated crazing agent, as for example, a 50/50 mixture of cottonseed oil and oleic acid, for 24 hours. The flexural strength of the bars, and of control bars held in 1% strain in air, was measured according to ASTM Standard Procedure D790, and the ESCR was calculated by dividing the average flexural strength of the test bars by that of the control bars.

Emulsion particle sizes were measured by use of a Nanosizer™ instrument manufactured by Coulter Electronics. This instrument estimates the average size of emulsion polymer particles by following the light scattered by the Brownian motion of the emulsion.

EXAMPLE 1

This example illustrates a method for preparing the modifiers of the present invention; in this three-step procedure the rubbery core polymer is formed as a latex (Step A) the particle size of the latex is increased by controlled destabilization or agglomerization (Step B), and an outer shell is grafted onto the agglomerated core polymer (Step C).

Step A

The following were charged to a stainless steel reactor:

| | |
|---|---|
| Butadiene | 75 parts |
| Styrene | 25 parts |
| Potassium Oleate | 5 parts |
| n-Dodecyl Mercaptan | 0.5 parts |
| Potassium Persulfate | 0.3 parts |
| Deionized Water | 180 parts |

The reactor was heated with stirring to 50° C. and held at that temperature for 24 hours. The final conversion to polymer was at least 95%.

Step B

The following were charged to a glass flask:

| | |
|---|---|
| Rubber Latex of Step A | 100 parts |
| Water | 140 parts |

The flask contents were stirred and adjusted to pH 4.5 with acetic acid (approximately 2 parts), then to pH 10 with sodium hydroxide (approximately 5 parts).

Step C

A glass flask was charged with 80 parts of the wet, agglomerated rubber latex of Step B. The flask contents are heated to, and maintained at, 50° C. with stirring, and the following are charged to the flask:

| | |
|---|---|
| Styrene | 20 parts |
| Sodium Formaldehyde Sulfoxylate | 0.06 parts |
| (Ethylenedinitrilo) tetraacetic acid, disodium salt | 0.006 parts |
| Ferrous Sulfate | 0.0012 parts |
| Water | 510 parts |

To the resulting mixture 0.063 parts of tert-butyl hydroperoxide was added over a period of two hours. The final conversion to polymer was at least 99%, and the final emulsion particle size was 190 nanometers (nm), as measured by Nanosizer. The resulting modifier polymer was stabilized with 2,6-di-tert-butyl-4-methylphenol, marketed as Ionol, and was isolated by salt coagulation. The dried modifier had a toluene swell index of 19. The modifier had the following overall composition:

Bd/Sty

60/40

It is understood that the above example represents only one method for preparing the additive polymer of the present invention. Other methods known to those skilled in the art may be used, as for example that of Goldman, U.S. Pat. No. 4,443,585, which is hereby incorporated into the present specification, provided that the reaction conditions are controlled as discussed above to yield polymers having a toluene swell index within the range of the present invention.

EXAMPLE 2

This example illustrates the improvement in impact strength obtainable using the modifiers of the present invention. Notched Izod impact strength was determined for an unmodified HIPS (a general-purpose, medium-impact, injection-molding grade of HIPS prepared by conventional bulk polymerization and marketed as Styron 489 by Dow Chemical) and for the same HIPS modified at 20% loading with comparative, conventional modifiers of the prior art, block copolymer modifiers of the prior art, and the modifiers of the present invention. The conventional MBS modifiers are crosslinked core-shell polymers typically employed for physical-property modification of poly(vinyl chloride). Modifier A has a rubbery core of poly(butadiene) grafted with a copolymer of styrene and methyl methacrylate, Modifier B has a rubbery core of butadiene-butyl acrylate copolymer grafted with a copolymer of styrene and methyl methacrylate, and Modifier C, a commercial modifier marketed as Metablen C-223 by Mitsubishi Chemical Industries, Ltd., has a rubbery core of poly(butadiene) agglomerated to a larger particle size and subsequently grafted with a copolymer of styrene and methyl methacrylate. The modifier of the present invention may be prepared according to the procedure of Example 1; the particular modifier used has the overall composition:

Bd/Sty 62.5/37.5 and is identified in Table I as Modifier D. Izod impact values were determined using a 3.2 -mm notched specimen at 23° C.

TABLE I

| Modifier | Modifier Type | Notched Izod Impact Value, Joules/Meter | Swell Index | Particle Size, um |
|---|---|---|---|---|
| None | Matrix Polymer | 101 | — | — |
| A | Conventional MBS | 117 | 10.5 | 0.2 |
| B | Conventional MBS | 123 | 10.5 | 0.2 |
| C | Conventional MBS | 171 | 11.3 | 0.5 |
| D | Present Invention | 438 | 23 | 0.18 |

EXAMPLE 3

This example illustrates the effectiveness of the modifiers of the present invention for toughening filled matrix polymer. The modifier may be prepared according to the procedure of Example 1, and has an overall composition of 60 parts butadiene, 36 parts styrene and 4 parts methyl methacrylate; it has a swell index of 14 and a particle size of 0.18 µm This modifier was blended at 20% loading with the HIPS described in Example 4 and the indicated levels of the indicated fillers, and notched Izod impact strength was determined for the resulting blends at 23° C. for 3.2 mm and 6.4 mm notches. The fillers used were calcium carbonate, marketed as Winnofil S by ICI Americas, Inc. talc, marketed as Mistron by Cyprus Industrial Minerals Co., and wollastonite, marketed as Wollastakup G by Nyco Products Co. The results of these determinations are shown in Table II

TABLE II

| | Notched Izod Impact Strength, Joules/Meter at 23° C. | |
|---|---|---|
| Filler Loading and Type | 3.2 mm | 6.4 mm |
| No Filler, Unmodified | 155 | 144 |
| No Filler, Modified | 358 | 262 |
| 10% CaCO$_3$ | 235 | 64 |
| 20% CaCO$_3$ | 64 | 43 |
| 10% Talc | 165 | 101 |
| 20% Talc | 64 | 48 |
| 10% Wollastonite | 192 | 181 |
| 20% Wollastonite | 139 | 133 |

EXAMPLE 4

This example illustrates the effectiveness of the modifiers of the present invention for improving the toughness of clear, unmodified styrenic polymers. The modifier used is the one used in Example 2. Two clear, unmodified matrix polystyrene polymers were blended with this modifier: a general-purpose, injection-molding grade of clear, unmodified polystyrene homopolymer marketed as Styron 666 by Dow Chemical Company, and a clear, unmodified copolymer of styrene and a minor amount of methyl methacrylate marketed as NAS by Richardson Polymer Corp. Improvement of the impact strength is shown for various loadings of modifier in Table III.

TABLE III

| Modifier Loading | Matrix Polymer | Notched Izod Impact Strength, J/m at 23° C. | |
|---|---|---|---|
| | | 3.2 mm | 6.4 mm |
| 0 | 666 | 11 ± 5 | 11 ± 5 |
| 20% | 666 | 11 ± 0 | 21 ± 0 |
| 30% | 666 | 27 ± 5 | 21 ± 0 |
| 40% | 666 | 37 ± 5 | 32 ± 5 |
| 0 | NAS | 11 ± 5 | 11 ± 0 |
| 20% | NAS | 21 ± 0 | 27 ± 5 |
| 30% | NAS | 48 ± 21 | 32 ± 11 |
| 40% | NAS | 75 ± 11 | 107 ± 27 |

As may be seen from these results, the modifier of the present invention is less effective at improving toughness of clear, unmodified styrene polymers, but it nevertheless produces significant toughness improvement while maintaining very high gloss.

EXAMPLE 5

This example illustrates that the modifiers of the present invention are effective at improving impact strength of HIPS matrix polymers containing minor amounts of other comonomers. The modifier of the present invention has a composition of 60.6 parts butadiene, 36.4 parts styrene and 3.0 parts methyl methacrylate, and has a swell index of 15.5 and a particle size of 0.17 µm. The matrix polymer used in this example is a HIPS type polymer containing approximately 10–16% copolymerized maleic anhydride, marketed as Dylark 350 by Arco Chemical Co. The results are shown in Table IV.

TABLE IV

| Modifier Loading | Notched Izod Impact Strength J/m at 23° C. | | Dynatup Dart Impact Strength, Joules at 23° C. |
|---|---|---|---|
| | 3.2 mm | 6.4 mm | |
| 0 | 112 | 101 | 11.7 ± 4.3 |
| 5% | 123 | 107 | 14.5 ± 3.9 |
| 10% | 149 | 123 | 19.2 ± 1.6 |
| 15% | 181 | 139 | 25.5 ± 3.0 |

EXAMPLE 6

This example illustrates that the modifier of the present invention is effective at improving the impact strength of polystyrene blended with other compatible thermoplastics, such as polyphenylene ethers. In Table V the results of modifying such blends with conventional MBS modifiers and with modifiers of the present invention are shown. The modifier of the present invention has a composition of 62.5 parts butadiene and 37.5 parts styrene; it has a swell index of 13.4 and a particle size of 0.18 μm. The matrix polymer is a blend of polystyrene, poly(2,6-dimethyl-p-phenylene oxide) and a mineral filler; the blend is marketed as Noryl HS-2000 by General Electric Co. The conventional modifiers are those described in Example 4.

TABLE V

| Modifier | Modifier Loading | Modifier Type | Notched Izod Impact Strength, J/m | |
|---|---|---|---|---|
| | | | 3.2 mm | 6.4 mm |
| None | 0 | — | 96 | 91 |
| | 5% | Present Invention | 283 | 187 |
| "A" of Ex. 2 | 5% | Conventional MBS Modifier | 224 | 139 |
| "B" of Ex. 2 | 5% | Conventional MBS Modifier | 230 | 149 |

EXAMPLE 7

This example illustrates the effectiveness of the modifiers of the present invention in improving the resistance of HIPS polymers to environmental stress crazing (ESCR). The action of food oils, such as butter or oleic acid-cottonseed oil mixtures on HIPS is to degrade tensile strength and impact resistance, especially when the surface of the HIPS is held under tensile strain. Table VI shows ESCR values for each of three HIPS materials at various loadings of Modifier D from Example 2 when exposed to butter for 24 hours at room temperature. The matrix polymers are a general-purpose, medium-impact-strength, injection-molding grade of HIPS prepared by conventional bulk polymerization and marketed as Styron 489, a general-purpose, low-impact, extrusion grade of HIPS marketed as Styron 484, both by Dow Chemical Co., and an extra-high-impact HIPS marketed as Hostyren 840 by American Hoechst Corp.

TABLE VI

| Modifier Loading Weight % | ESCR Rating (% Retention of Flexural Strength) Resin | | |
|---|---|---|---|
| | Styron 484 | Styron 489 | Hostyren 840 |
| 0 | 68% | 50% | 15% |
| 10 | 86% | 97% | 87% |
| 20 | 91% | 97% | — |

EXAMPLE 8

This example illustrates that the modifier of the present invention may be used to improve the balance of properties obtained with blends of HIPS and clear, unmodified polystyrene. As is shown in Table VII, impact strength is improved while ESCR, tensile strength and gloss are maintained at high levels. The clear, unmodified polystyrene used in this example is a general-purpose grade, and the HIPS materials are a medium-impact, injection-molding grade polymer marketed as 4324 and an extra-high-impact, extrusion-grade resin marketed as 7500, both by Mobil Chemical Co. The modifier of the present invention has a composition of 62.5 parts butadiene and 37.5 parts styrene; it has a swell index of 16.3 and a particle size of 0.17 μm.

TABLE VII

| HIPS Resin | Wt % Modifier | Wt % Crystal Polystyrene | 3.2 mm Izod 23° C. J/m | Gloss 60° | Tensile Yield Stress, MPa | % ESCR 24 Hrs |
|---|---|---|---|---|---|---|
| 4324 | 0 | 0 | 91 | 75 | 24 | * |
| 4324 | 15 | 0 | 198 | 78 | 28 | 54 |
| 4324 | 15 | 15 | 181 | 85 | 30 | * |
| 4324 | 15 | 30 | 144 | 85 | 31 | * |
| 7500 | 0 | 0 | 133 | 47 | 26 | 64 |
| 7500 | 15 | 0 | 299 | 61 | 25 | 86 |
| 7500 | 15 | 15 | 272 | 70 | 28 | 82 |
| 7500 | 15 | 30 | 235 | 74 | 31 | 54 |

*samples fractured during immersion in cottonseed oil/oleic acid

EXAMPLE 9

The preceding examples show that the modifiers of the present invention are effective in modifying polystyrenes, related copolymers and blends thereof. This example illustrates that the modifiers of the present invention are also surprisingly effective at modifying polypropylene. As shown in Table VIII, a modifier of the present invention, the modifier of Example 8, is effective at improving the ductility of polypropylene, as measured by the tensile elongation to breakage test and impact strength measured by both the notched Izod impact test and Dynatup dart impact test. Prior art MBS modifiers, such as MBS modifier A as described in Example 2 are significantly less effective than modifiers of the present invention. In the example, the modifiers were melt blended with a general-purpose, medium-flow grade of polypropylene homopolymer, marketed as Pro-Fax 6323 by Himont. Modifiers of the present invention are also expected to be useful in modifying polypropylene copolymers, as well as blends of polypropylenes and styrenic resins.

TABLE VIII

| Modifier | Loading weight % | Tensile Elongation to Break, % | Notched Izod Impact J/m at 23° C. | Dynatup Impact J at 23° C. |
| --- | --- | --- | --- | --- |
| None | 0 | 11 | 11 | 0.31 ± .03 |
| Present Invention | 40 | >260 | 27 | 4.6 ± 2.2 |
| Conventional MBS A of Ex. 2 | 40 | 20 | 5 | 0.19 ± .04 |

We claim:

1. An impact-property-modified polymer blend, comprising:
   a) from about 60 to about 95 weight percent, based on the polymer blend, of a matrix polymer selected from the group consisting of styrenic polymers and copolymers and their blends, high impact polystyrene and high impact polystyrene blends, polyphenylene oxides, and polypropylene; and
   b) from about 5 to about 40 weight percent, based on the polymer blend, of an additive polymer comprising particles having
      i. a rubber core of crosslinked diolefin polymer or copolymer containing mercaptan chain regulating agents derived from a conjugated diolefin monomer, the rubber core further derived from 0 to 50%, based on the total core weight, of a vinyl monomer polymerized with the diolefin and selected from the group consisting of styrene, alkylstyrene having 1 to 8 carbon atoms in the alkyl group, alkyl acrylate having 1 to 8 carbon atoms in the alkyl group, and alkyl methacrylate having 1 to 8 carbon atoms in the alkyl group, and
      ii. the core being surrounded by one or more polymer shells at least one of which is a vinylaromatic polymer or copolymer polymerized from one or more monomers selected from the group consisting of vinylaromatic monomers, alkyl acrylate monomers having 1 to 8 carbon atoms in the alkyl group, alkyl methacrylate monomers having 1 to 8 carbon atoms in the alkyl group, and polyvinyl unsaturated crosslinking monomers, and the remainder of which shells are vinylaromatic polymers or copolymers or methyl methacrylate polymers or copolymers polymerized from one or more monomers selected from the group consisting of vinylaromatic monomers, methyl methacrylate, alkyl acrylate monomers having 1 to 8 carbon atoms in the alkyl group and polyvinyl unsaturated crosslinking monomers,
   the particles further having an average particle diameter smaller than about 250 nanometers and a toluene swell index from about 13 to about 45.

2. The polymer blend of claim 1 wherein the conjugated diolofin is butadiene.

3. The polymer blend of claim 1 wherein the vinyl monomer is an alkyl acrylate or methacrylate, the alkyl group having from 1 to 8 carbon atoms.

4. The polymer blend of claim 3 wherein the alkyl methacrylate is methyl methacrylate.

5. The polymer blend of claim 3 wherein the alkyl acrylate is butyl acrylate.

6. The polymer blend of claim 1 wherein the vinyl monomer is styrene.

7. The polymer blend of claim 1 wherein the average particle diameter is from about 50 to about 250 nanometers.

8. The polymer blend of claim 1 wherein the average particle diameter is from about 150 to about 200 nanometers.

9. The polymer blend of claim 1 wherein the toluene swell index is from about 15 to about 25.

10. The polymer blend of claim 1 wherein one of the monomers from which the vinylaromatic polymer or copolymer is polymerized is styrene.

11. The polymer blend of claim 1 wherein the vinylaromatic polymer or copolymer is polymerized from monomers in which a largest fraction is alkylstyrene vinylaromatic monomer.

12. The polymer blend of claim 11 wherein the alkylstyrene vinylaromatic monomer is alpha-methylstyrene.

13. The polymer blend of claim 1 wherein one of the monomers from which the vinylaromatic copolymer is polymerized is methyl methacrylate.

14. The polymer blend of claim 1 wherein one of the monomers from which the vinylaromatic copolymer is polymerized is ethyl acrylate.

15. The polymer blend of claim 3 wherein the alkyl acrylate is ethyl acrylate and the vinylaromatic copolymer is a copolymer with methyl methacrylate.

16. The polymer blend of claim 1 wherein the monomer forming the largest fraction of the monomers from which at least one of the remaining shells are polymerized is ethyl acrylate.

17. The polymer blend of claim 1 wherein the monomer forming the largest fraction of the monomers from which at least one of the remaining shells are polymerized is methyl methacrylate.

18. The polymer blend of claim 1 wherein the monomer forming the largest fraction of the monomers from which at least one of the remaining shells are polymerized is methyl methacrylate and another monomer from which at least one of the remaining shells are polymerized is ethyl acrylate.

19. The polymer blend of claim 1 wherein the ratio of core polymer or copolymer to shell polymers or copolymers is from about 30:70 to about 95:5.

20. The polymer blend of claim 1 wherein the ratio of core polymer or copolymer to shell polymer or copolymers is from about 60:40 to about 80:20.

21. The polymer blend of claim 1 wherein one or more of the shells is crosslinked.

* * * * *